Patented Oct. 4, 1932

1,881,348

UNITED STATES PATENT OFFICE

HEINRICH BERTSCH, OF CHEMNITZ, GERMANY, ASSIGNOR TO H. TH. BOHME AKTIEN-GESELLSCHAFT, OF CHEMNITZ, GERMANY, A CORPORATION OF GERMANY

TEXTILE TREATMENT LIQUID

No Drawing. Application filed August 18, 1928, Serial No. 300,613, and in Germany September 20, 1927.

One object of the invention is to produce an improved textile treatment liquid.

A further object is a method whereby the wetting properties of liquids may be enhanced particularly when such liquids are used for wetting fibres as in textile treatment processes.

It is known to enhance the action of treatment liquids in the textile industry by adding to the baths substances which improve the wetting powers of the treatment liquid and assist the impregnation by such liquid of the material treated therewith. Thus, for example, in mercerization use is made of the properties of the phenols, which although insoluble in water are soluble in alkaline liquids, by adding phenols to the mercerization liquor whereby the superficial activity of the liquor is increased.

According to this invention there is added to the treatment liquid a mixture of phenols with sulphonated oils obtained by sulphonation in the cold by sulphuric acid in excess with the aid of organic acids, anhydrides or chlorides, such sulphonated oils being hereinafter referred to in the claims as "very intensely sulphonated oils". The addition of such a mixture to a mercerization lye is advantageous firstly by dissolving clearly in the mercerization lye and secondly by imparting to said lye far stronger wetting powers than the phenols alone. Mixtures of phenols with sulphonated oils have also proved to be excellent media in the wider treatment of textile materials, for instance, in carrying out the washing process, because the phenol employed is rendered water-soluble by the addition of a sulphonated oil and is enabled to exercise completely its favourable effect upon the washing process. Advantageously tri-cresol is employed.

Example 300 kgs. of oleic acid are mixed with 100 kgs. of acetic anhydride and 300 kgs. of concentrated sulphuric acid are stirred slowly into this mixture at temperatures between 0 and +5°. After the sulphuric acid has been added, the reaction product is cooled with ice and then washed with 300 kgs. of salt solution. The washed sulphonate is neutralized and mixed in equal proportions with tri-cresol. Next soda lye is added to this mixture until a clear solution is formed. This clear oil is then soluble in soda lye of 30° Bé. and imparts an increased wetting power thereto.

The sulphonated oils produced by the foregoing method are stable towards concentrated solutions of acids, alkalies and salts and show a higher degree of sulphonation than Monopole soap and the like.

I claim:—

1. Method of enhancing the effect of liquids for the treatment of textiles, characterized by the addition to such liquids of a mixture of phenols with very intensely sulfonated oils stable towards concentrated solutions of acids, alkalies and salts and showing a higher degree of sulfonation than Monopole soap and the like.

2. A liquid preparation for the treatment of fibrous materials comprising a caustic alkali solution with an addition of phenols and very intensely sulfonated oils in admixture.

3. A liquid preparation for the treatment of fibrous materials comprising a caustic alkali solution with an addition of tri-cresol and very intensely sulfonated oils in admixture.

4. A liquid preparation for the treatment of fibrous materials comprising a caustic soda solution with an addition of tri-cresol and very intensely sulfonated oleic acid stable towards concentrated alkali solution.

5. A composition for the treatment of fibrous material consisting of a neutralized very intensely sulfonated oil, a phenol and sufficient caustic alkali solution to form a clear solution.

HEINRICH BERTSCH.